United States Patent [19]

Blackwell

[11] Patent Number: 4,474,922

[45] Date of Patent: Oct. 2, 1984

[54] FILLED POLY(ARYLENE SULFIDE) COMPOSITIONS

[75] Inventor: Jennings P. Blackwell, Bartlesville, Okla.

[73] Assignee: Phillips Petroleum Co., Bartlesville, Okla.

[21] Appl. No.: 498,995

[22] Filed: May 27, 1983

[51] Int. Cl.$^3$ .............................................. C08K 3/30
[52] U.S. Cl. .................................... 524/423; 524/609
[58] Field of Search ........................................ 524/423

[56] References Cited

U.S. PATENT DOCUMENTS

| | | | |
|---|---|---|---|
| 3,354,129 | 11/1967 | Edmonds, Jr. et al. | 260/79 |
| 4,115,283 | 9/1978 | Needham | 252/12.4 |
| 4,130,675 | 12/1978 | Vassiliou et al. | 524/423 |
| 4,173,681 | 11/1979 | Durrieu et al. | 428/409 |

*Primary Examiner*—Lewis T. Jacobs
*Attorney, Agent, or Firm*—Mark A. Montgomery

[57] ABSTRACT

The addition of an alkaline earth metal sulfate improves the melt flow properties of highly filled poly(arylene sulfide) compositions.

18 Claims, No Drawings

FILLED POLY(ARYLENE SULFIDE) COMPOSITIONS

This invention relates to poly(arylene sulfide) compositions containing inorganic additives. This invention also relates to certain barium sulfate-glass-filled poly(arylene sulfide) compositions. This invention also relates to a method for modifying properties of glass-filled poly(arylene sulfide) compositions by adding an alkaline earth metal sulfate such as barium sulfate to the compositions. This invention also relates to certain glass-filled poly(arylene sulfide) compositions containing barium sulfate in combination with other fillers. More particularly, this invention relates to methods for increasing the flow rate of glass-filled poly(arylene sulfides). This invention relates to improving the melt flow of uncured and partially uncured poly(arylene sulfide) resins by the addition of an alkaline earth metal sulfate such as barium sulfate.

For many applications, poly(arylene sulfide) molding compounds are highly filled to obtain a variety of desired properties. The high amounts of these fillers result in loss of melt flow properties, making the materials very difficult to mold, that is the material will not flow into all the corners of the mold during molding.

In my previous application (Ser. No. 300,859), I disclose the addition of certain organosilanes to uncured or partially uncured glass-filled poly(arylene sulfide) compositions to increase or decrease the flow rate. This invention is an alternative method of increasing the flow rate of these poly(arylene sulfides) by the addition of an alkaline earth metal sulfate such as barium sulfate.

I am aware that U.S. Pat. No. 4,115,283 (Needham) discloses barium sulfate in combination with glass-filled poly(arylene sulfide). The Needham patent teaches that small quantities (10-20 weight percent of the total composition) of barium sulfate can be added to an anti-friction composition to replace the antimony trioxide and still retain anti-friction quality for bearing use. The anti-friction composition is produced by incorporating glass, a solid lubricant and fillers into a cured poly(arylene sulfide). Needham teaches the addition of barium sulfate to a cured poly(arylene sulfide) and its purpose is to maintain the anti-friction qualities of the final product. The utility of using barium sulfate to increase the melt flow of uncured glass-filled poly(arylene sulfide) compositions is not disclosed in the Needham patent. This invention is used with uncured or partially uncured poly(arylene sulfide) and the amount of barium sulfate of the present invention (about 50 weight percent of the total composition) is much greater than the Needham patent.

It is an object of this invention to provide new and useful compositions suitable for molding and encapsulating applications.

A further object of this invention is to provide a method for modifying properties of glass-filled poly(arylene sulfide) compositions.

A further object of this invention is to provide methods for increasing flow rates of glass-filled poly(arylene sulfide) compositions.

More particularly, it is an object of this invention to provide poly(arylene sulfide) composition having improved melt flow properties.

Other aspects, objects and the various advantages of this invention will become apparent upon a study of the specification and the appended claims.

In accordance with the invention, the molding and encapsulating properties of filled arylene sulfide resins are improved by the incorporation of a melt flow improving amount of an alkaline earth metal sulfate such as barium sulfate.

One embodiment of the invention is an improved process for producing fiberglass filled uncured poly(arylene sulfide) polymers exhibiting improved melt flow characteristics wherein the improvement comprises adding an alkaline earth metal sulfate such as barium sulfate (barite) in an amount sufficient to improve melt flow characteristics.

Another embodiment of the invention is a polymer composition comprising fiberglass filled poly(arylene sulfide) and barium sulfate (barite) in an amount sufficient to improve the melt flow characteristics of the composition.

Any uncured or partially cured poly(arylene sulfide) whether homopolymer, copolymer, terpolymer and the like, or a blend of such polymers, can be used in the practice of any aspect of this invention. In this application an uncured or partially cured polymer is a polymer the molecular weight of which can be increased by either lengthening of a molecular chain or by cross-linking or by combination of both by supplying thereto sufficient energy, such as heat. A process which increases the molecular weight of the polymer shall be designated as a curing process. The poly(arylene sulfide) polymers, often abbreviated PAS, contemplated in the composition of this invention include those described in U.S. Pat. No. 3,354,129 and U.S. Pat. No. 3,919,177. The presently preferred polymer is poly(phenylene sulfide), often abbreviated PPS. Other examples of poly(arylene sulfides) are poly(4,4'-biphenylene sulfide); poly(2,4-polylene sulfide); copolymer of p-dichlorobenzene, 2,4-dichlorotoluene and sodium sulfide and the like. At present, the preferred poly(arylene sulfide for use in this invention is poly(phenylene sulfide) that is uncured or partially cured having a melt flow at least over about 1,000 grams/10 minutes.

While any melt flow improving amount of an alkaline earth metal sulfate that is added to a poly(arylene sulfide) is contemplated by this invention, the preferred range of alkaline earth metal sulfate is about 30-60 percent by weight of the total composition.

The addition of any melt flow improving amount of an alkaline earth metal sulfate to highly filled poly(arylene sulfide) compounds is also contemplated by this invention as is the use of an alkaline earth metal sulfate such as barium sulfate to replace part of the fillers in poly(arylene sulfide) compounds.

As is usual in polymeric compositions and blends based on poly(arylene sulfide) a variety of other additives can be used in minor amounts of up to about 3 percent by weight of the total composition. These additives include such materials as internal lubricants, processability agents, coupling agents such as silanes, mold corrosion inhibitors such as $Li_2CO_3$, and pigments. Compatible processability agents or lubricants can be selected from among solid ethylene copolymers (see U.S. Pat. No. 4,134,874), oils, saturated fatty acid salts such as zinc stearate etc., glycerides and phosphated glycerides of saturated fatty acids containing from about 10 to 30 carbon atoms, mono and dialkanolamides derived from saturated fatty acids and esters derived from a saturated long chain fatty acid and long chain saturated aliphatic alcohol.

Mineral fillers and glass fillers can be present in the compositions of this invention in a total amount of up to about 65 weight percent of the total composition, preferably in a range of about 30 to 60 weight percent of the total composition. Mineral fillers useful in this invention can be chosen from those minerals such as calcium carbonate, silica, talc, mica, iron oxide, metal powder and the like, while the glass materials can be chosen from any of those products commercially available which generally find use as fillers and reinforcing agents in polymeric blends. These can be chosen from chopped fiberglass or small glass beads, for instance, with the preferred material for this invention being glass fiber.

It is believed that any conventional mixing known in the art, such as an internal mixer or screw extruder could be a suitable mode of mixing or blending compositions useful in the present invention. The preferred mode, however, is in a screw extruder at about 280° C. when poly(phenylene sulfide) is employed. The method of determining the optimal temperature and pressure according to the polymer used is known to those skilled in the art.

The compositions made by this invention would be useful for any flow molding, injection molding or encapsulating applications where the flow of molten material is needed to fill an area or volume.

The examples following should be taken as exemplary and not exclusive in illustrating the invention.

EXAMPLE I

This example describes the preparation and properties of three molding/encapsulating compounds containing essentially uncured poly(phenylene sulfide) (PPS), fiberglass, an inorganic mineral filler, and an internal lubricant according to Recipes 1, 2 and 3.

| Recipe 1 (Control) | |
|---|---|
| "FS-1" poly(phenylene sulfide)[a] | 900 grams |
| Fiber glass[b] | 1100 grams |
| Acrawax-C[c] | 20 grams |
| Recipe 2 (Control) | |
| "FS-1" poly(phenylene sulfide)[a] | 1125 grams |
| Fiber glass[b] | 375 grams |
| Silica Powder | 1000 grams |
| Acrawax-C[c] | 20 grams |
| Recipe 3 (Invention) | |
| "FS-1" poly(phenylene sulfide)[a] | 900 grams |
| Fiber glass[b] | 300 grams |
| Barite[d] | 800 grams |
| Acrawax-C[c] | 20 grams |

[a]an essentially uncured PPS having a flow rate of about 3000, determined at 316° C. according to a modified ASTM D1238 procedure using a standard orifice and a total load of 5.0 Kg (including the weight of the piston); marketed by Phillips Petroleum Company;
[b]Owens Corning 497 AA fiber glass; chopped strands of ⅛–¼ inch length;
[c]ethylenebis(stearamide) marketed by Glyco Chemical Corporation, used as an internal lubricant;
[d]BaSO₄, supplied by Thompson-Weinman Co.

The ingredients of the three compounds were blended and extruded in a Baker-Perkins 401B twin screw extruder at 280° C. in all zones. The rotor speeds for compounding Recipes 2 and 3 were 150 r.p.m. in the twin screw zone and 75 r.p.m. in the single screw zone. The compound of Recipe 1 did not extrude under these conditions, and it was necessary to add the ingredients in increments and blend them at rotor speeds of 100 r.p.m. in the twin screw zone and 50 r.p.m. in the single screw zone at 280° C.

The three compounds were molded in a New Britain 75 OHP molding machine at conditions shown in Table I.

TABLE 1

| Recipe | Run 1 (Control) 1 | Run 2 (Control) 2 | Run 3 (Invention) 3 |
|---|---|---|---|
| Injection Pressure, psi | 2000 | 3000 | 2800 |
| Hold Pressure, psi | 800 | 800 | 800 |
| Barrel Temperature, °F. | 600 | 600 | 600 |
| Mold Temperature, °F. | 275 | 275 | 275 |
| Cycle Time, Seconds | 32 | 32 | 32 |

Pertinent physical properties of the three molded compounds are summarized in Table II.

TABLE II

| | Run 1 (Control) | Run 2 (Control) | Run 3 (Invention) |
|---|---|---|---|
| Flexural Modulus[a], MPa | 18051 | 11990 | 9617 |
| Flexural Strength[a], MPa | 94.4 | 51.6 | 54.0 |
| Izod Impact, Notched[b], J/m | 72.3 | 50.5 | 61.6 |
| Tensile Strength[c], MPa | 74.6 | 34.1 | 39.2 |
| Density, g/cc | 1.787 | 1.730 | 1.995 |
| Flow Rate[d], g/10 min. | 316 | 911 | 2007 |

[a]determined according to ASTM D790
[b]determined according to ASTM D256
[c]determined according to ASTM D638
[d]before molding, determined at 316° C. according to a modified ASTM D1238 procedure using a standard orifice and a total load of 5.0 Kg (including the weight of the piston).

Data in Table II show that the molded compound of Run 3 containing barite has a much higher flow rate (i.e., lower viscosity) than those of Run 1 and 2 (about 100% higher than for Run 2 and about 500% higher than for Run 1), which is desirable for molding objects of intricate shapes or for encapsulating electronic circuits. This higher flow rate is not primarily caused by the higher density of the compound of Run 3, which is only about 10-15% higher than that of the other two compounds. Physical properties of all three compounds are comparable, with the exception of the flexural modulus.

EXAMPLE II

In this example the preparation and properties of two fiber glass filled PPS molding compounds are described. The composition of the two molding compounds are shown in Table III.

TABLE III

| Ingredients | Recipe 4 (Control) | Recipe 5 (Invention) |
|---|---|---|
| "FS-5" PPS[a], grams | 692 | 692 |
| Fiber Glass[b], grams | 692 | 692 |
| Talc Powder, grams | 593 | — |
| Barite Powder, grams | — | 593 |
| Zinc Stearate[c], grams | 2 | 2 |
| Lithium Carbonate[d], grams | 20 | 20 |

[a]partially cured PPS having a flow rate of 850 ± 100 g/100 min. (determined according to the procedure described Example I);
[b]Owens Corning 497 AA chopped strands of ⅛–¼ inch length;
[c]used as an internal lubricant;
[d]used as a mold corrosion inhibitor.

These compounds were extruded in a Davis-Standard 1½ inch Thermatic III extruder. Molding was carried out according to the conditions summarized in Table I except that injection and "hold" pressures were 4600 psi/3000 psi for Recipe 4 and 3600 psi/3000 psi for Recipe 5.

Pertinent physical properties of the two molded compounds of this example are summarized in Table IV.

TABLE IV

|  | Run 4 (Control) | Run 5 (Invention) |
|---|---|---|
| Recipe Number | 4 | 5 |
| Flexural Modulus[a], MPa | 22055 | 18998 |
| Flexural Strength[a], MPa | 125 | 144 |
| Izod Impact, Notched a, J/M | 65.1 | 76.7 |
| Tensile Strength[a], MPa | 68.6 | 93.7 |
| Density, g/cc | 1.978 | 2.135 |
| Flow Rate[a], g/10 min. | 49 | 180 |

[a]footnotes to Table II.

Data in Table IV show that the compound of Run 5 containing barite has an almost 4 times higher flow rate than one containing talc (Run 4). Again, the slightly higher density of the Run 5 compound cannot account for the above-cited substantial increase in flow rate. Flexural, tensile and impact characteristics are better for the compound of this invention (Run 5) than for the control compound (Run 4).

EXAMPLE III

In this example the preparation and physical properties of two more fiber glass filled PPS compounds are described. Compounds were prepared according to Recipes 6 and 7.

| Ingredients | Recipe 6 (Control) | Recipe 7 (Invention) |
|---|---|---|
| "V-1" PPS[a], grams | 70 | 70 |
| Fiber glass[b], grams | 30 | 30 |
| Treated Silica[c], grams | 100 | — |
| Treated Barite[d], grams | — | 100 |
| Spermafol 5200[e], grams | 6 | 6 |

[a]an uncured PPS having a flow rate of 5000–6000 g/10 minutes (determined according to the procedure described in Example I), produced by Phillips Petroleum Company;
[b]Owens Corning 497 AA fiber glass; chopped strands of ⅛-¼ inch length;
[c]100 grams of silica powder were mixed with a solution of 1.6 grams of Dow Corning's Silane Z-6032 in 100 milliliters of toluene. Z-6032 is a solution containing 40 percent by weight of methanol and 60 percent by weight of a compound having the formula:

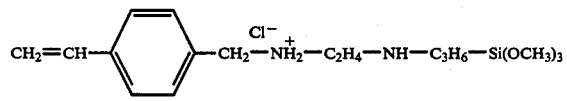

The formed silica/toluene/Z-6032 slurry was evaporated to dryness in a Roto-Vac vacuum drier.
[d]100 grams of barite (BaSO$_4$) powder were treated in accordance with the procedure described in (c).
[e]a hydrogenated sperm oil marketed by Sherex Chemical Co., Dublin, Ohio.

Components of Recipes 6 and 7 were compounded and extruded twice in a 1 inch NRM bench model extruder at barrel temperature of 600° F. Extruded compounds were ground for flow rate determinations according to footnote d) of Table I. Results are:

Run 6 (Recipe 6) containing silica (Control): 465 g/10 minutes;

Run 7 (Recipe 7) containing barite (Invention): 1246 g/10 minutes.

These results confirm those described in Examples I and II showing that the addition of barium sulfate to filled uncured poly(arylene sulfide) compositions increases the melt flow considerably, making them suitable for molding and encapsulating applications.

I claim:

1. A high melt flow polymer composition comprising
   (a) an essentially uncured poly(arylene sulfide) having a melt flow at least about 1,000 grams/10 minutes;
   (b) a reinforcing material in the range of about 10 to 60 weight percent; and
   (c) an alkaline earth metal sulfate in an amount sufficient to increase the melt flow of the polymer composition.

2. The composition according to claim 1 wherein said reinforcing material is glass fibers.

3. The composition according to claim 1 wherein said sulfate is barium sulfate.

4. The composition according to claim 1 wherein said essentially uncured poly(arylene sulfide) is poly(phenylene sulfide).

5. The composition according to claim 3 wherein said barium sulfate is in the range of about 30 to 60 weight percent.

6. A high melt flow polymer composition comprising:
   (a) an essentially uncured poly(arylene sulfide) in the range of about 30 to 50 weight percent having a melt flow at least about 1,000 grams/10 minutes,
   (b) a reinforcing material in the range of about 10 to 40 weight percent,
   (c) an internal lubricant in the range of about 0 to 10 weight percent, and
   (d) barium sulfate in an amount sufficient to increase the melt flow of the polymer composition.

7. The composition according to claim 6 wherein said internal lubricant is selected from the group consisting of ethylenebis(stearamide), zinc stearate and hydrogenated sperm oil.

8. The composition according to claim 6 wherein said essentially uncured poly(arylene sulfide) is poly(phenylene sulfide).

9. The composition according to claim 6 wherein said reinforcing material is chopped fiber glass strands of about ⅛-¼ inch in length.

10. The composition according to claim 6 wherein another filler is also added.

11. The composition according to claim 6 wherein said barium sulfate is in the range of about 30 to 60 weight percent.

12. A method for increasing the melt flow of poly(arylene sulfide) compositions comprising combining
   (a) an essentially uncured poly(arylene sulfide) having a melt flow at least over about 1,000 grams/10 minutes,
   (b) a reinforcing material in the range of about 10 to 60 weight percent, and
   (c) an alkaline earth metal sulfate in an amount sufficient to increase the melt flow of the polymer composition.

13. The method according to claim 12 wherein said essentially uncured poly(arylene sulfide) is poly(phenylene sulfide), and said reinforcing material is chopped fiber glass strands of about ⅛-¼ inch in length.

14. The method according to claim 12 wherein said alkaline earth metal sulfate is barium sulfate and is in the range of about 30 to 60 weight percent.

15. A high melt flow polymer composition comprising (a) an essentially uncured poly(arylene sulfide) having a melt flow at least about 1000 grams/10 minutes; (b) a reinforcing material in the range of about 10 to about 60 weight percent; and (c) an alkaline earth metal sulfate in the range of about 30 to about 60 weight percent in an amount sufficient to increase the melt flow of the composition.

16. A molded article of manufacture made from the polymer composition of claim 15.

17. A high melt flow polymer composition comprising (a) an essentially uncured poly(arylene sulfide);

(b) a reinforcing material in the range of about 10 to about 60 weight percent; and (c) barium sulfate in range of about 30 to about 60 weight percent.

18. The composition according to claim 17 wherein the poly(arylene sulfide) is poly(phenylene sulfide) having a melt flow of at least about 1,000 grams/10 minutes.

* * * * *